No. 887,030.

PATENTED MAY 5, 1908.

J. J. BYERS.
BRAKE LEVER.
APPLICATION FILED MAR. 7, 1908.

WITNESSES
R A Balderson
W W Swartz

INVENTOR
Jacob J. Byers,
by Bakewell Byrnes & Parmelee
his Attys.

UNITED STATES PATENT OFFICE.

JACOB J. BYERS, OF CAMERON, MISSOURI, ASSIGNOR TO THE NATIONAL MALLEABLE CASTINGS COMPANY, OF CLEVELAND, OHIO, A CORPORATION OF OHIO.

BRAKE-LEVER.

No. 887,030.   Specification of Letters Patent.   Patented May 5, 1908.

Application filed March 7, 1908. Serial No. 419,724.

*To all whom it may concern:*

Be it known that I, JACOB J. BYERS, of Cameron, Clinton county, Missouri, have invented a new and useful Brake-Lever, of which the following is a full, clear, and exact description, reference being had to the accompanying drawings, forming part of this specification, in which—

Figure 1:
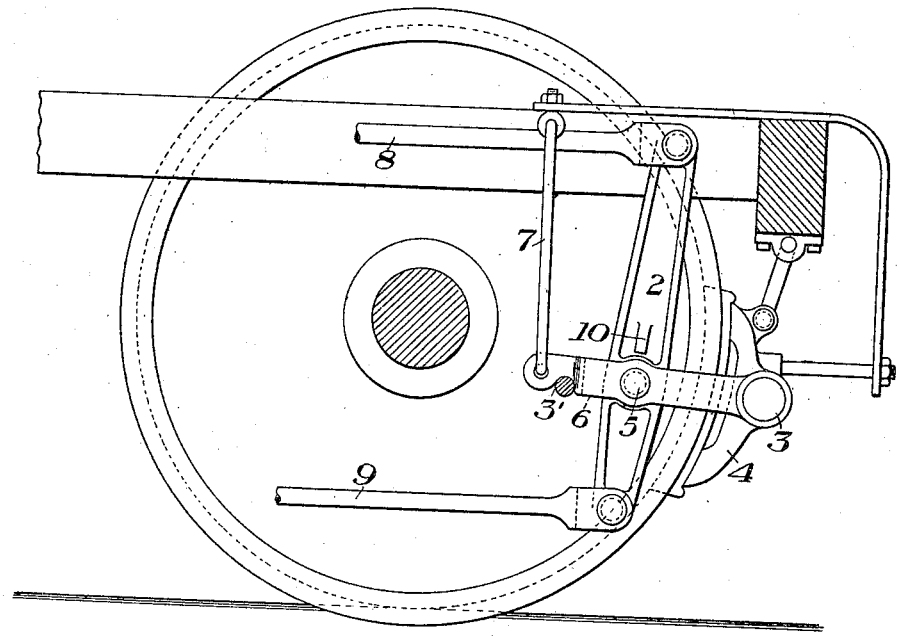
Figure 2:
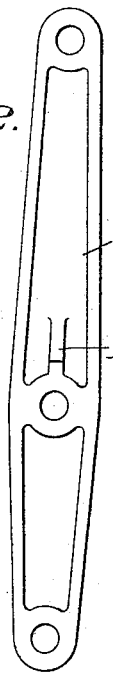
Figure 3:
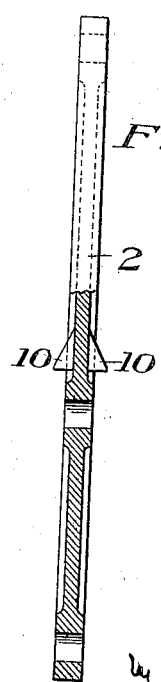

Figure 1 shows my invention in side elevation, applied to a car; Fig. 2 is a side elevation of the brake lever; Fig. 3 is a longitudinal section thereof.

In the construction of brake riggings which has heretofore been common, serious accidents have sometimes happened by reason of the detachment of the brake lever from the fulcrum by which it is connected to the brake beam. In case such pivotal connection is broken, in the device heretofore used, the brake lever is apt to drop through the fulcrum so that its end will strike the ties of the railway track, and by engaging therein will damage the brake rigging, and may derail the car or wreck the train.

It is the purpose of my invention to render such accidents impossible.

As shown in the drawings, 2 represents the brake lever, 3, 3' are the arms of the brake beam which carries the brake shoes 4, and 5 is the pivot pin joining the brake lever to the slotted fulcrum 6 by which it is connected to the brake beam.

7 is a hanger by which this arm is supported.

8 is a rod which connects the lever to the brake cylinder, and 9 is a rod which connects its lower end to the brake lever at the opposite end of the truck.

My invention consists in providing the brake lever 2 at a point above where it passes through the slot of the fulcrum 6 with a projecting lug or lugs 10. When thus constructed, if the pivot pin 5 which connects the brake lever with the fulcrum 6 should break or become dislodged, the brake lever will be prevented from dropping through the slot of the fulcrum 6 by engagement thereon of the lug 10; and the liability of accident is thus prevented.

The advantages of my invention in its simplicity and effectiveness will be appreciated by those skilled in the art.

I claim:—

A brake rigging for cars, having, in combination a brake lever, and a slotted fulcrum pivotally connecting it with the brake, said lever having a lateral projection adapted to prevent dropping of the lever through said slot; substantially as described.

In testimony whereof, I have hereunto set my hand.

JACOB J. BYERS.

Witnesses:
A. O. BUCKIN, Jr.,
C. J. BERGSTROM.